United States Patent
Marks et al.

(10) Patent No.: US 7,437,462 B2
(45) Date of Patent: Oct. 14, 2008

(54) METHOD FOR ZONING DATA STORAGE NETWORK USING SAS ADDRESSING

(75) Inventors: Kevin Marks, Round Rock, TX (US); Gary Kotzur, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 468 days.

(21) Appl. No.: 11/326,623

(22) Filed: Jan. 6, 2006

(65) Prior Publication Data

US 2007/0162592 A1 Jul. 12, 2007

(51) Int. Cl.
G06F 15/16 (2006.01)
(52) U.S. Cl. ...................... 709/226; 709/224
(58) Field of Classification Search ......... 709/200–203, 709/217–227
See application file for complete search history.

(56) References Cited

U.S. PATENT DOCUMENTS

| | | | |
|---|---|---|---|
| 7,377,800 B2 * | 5/2008 | Gasser | 439/374 |
| 2004/0205259 A1 * | 10/2004 | Galloway | 710/3 |
| 2005/0080881 A1 * | 4/2005 | Voorhees et al. | 709/220 |
| 2005/0185599 A1 * | 8/2005 | Clayton | 370/254 |
| 2006/0101171 A1 * | 5/2006 | Grieff et al. | 710/36 |
| 2006/0230218 A1 * | 10/2006 | Warren et al. | 710/315 |
| 2007/0058619 A1 * | 3/2007 | Gopal Gowda et al. | 370/386 |
| 2007/0165660 A1 * | 7/2007 | Fang et al. | 370/410 |
| 2008/0126631 A1 * | 5/2008 | Bailey et al. | 710/74 |

* cited by examiner

*Primary Examiner*—Moustafa M Meky
(74) *Attorney, Agent, or Firm*—Baker Botts L.L.P.

(57) ABSTRACT

A method of zoning a fabric-attached (SAS) storage network. For each target attached to an expander, the expander maintains a list of SAS addresses of initiator devices that are permitted access to that's ports target devices. Configuration and management of zones may be accomplished using a management application, such as those using the SMP command protocol.

22 Claims, 4 Drawing Sheets

| BYTE/BIT | 7 | 6 | 5 | 4 | 3 | 2 | 1 | 0 |
|---|---|---|---|---|---|---|---|---|
| 0 | RESTRICTED (FOR OPEN ADDRESS FRAME) | DEVICE TYPE | | | ADDRESS FRAME TYPE (0h) | | | |
| 1 | RESTRICTED (FOR OPEN ADDRESS FRAME) | | | | | | | |
| 2 | RESERVED | | | | SSP INITIATOR PORT | STP INITIATOR PORT | SMP INITIATOR PORT | RESTRICTED (FOR OPEN ADDRESS FRAME) |
| 3 | RESERVED | | | | SSP TARGET PORT | STP TARGET PORT | SMP TARGET PORT | RESTRICTED (FOR OPEN ADDRESS FRAME) |
| 4 | RESTRICTED (FOR OPEN ADDRESS FRAME) | | | | | | | |
| 11 | | | | | | | | |
| 12 | SAS ADDRESS | | | | | | | |
| 19 | | | | | | | | |
| 20 | PHY IDENTIFIER | | | | | | | |
| 21 | RESERVED | | | | | | | |
| 27 | | | | | | | | |
| 28 | (MSB) | | | | | | | |
| 31 | CRC | | | | | | | (LSB) |

*FIG. 4*

METHOD FOR ZONING DATA STORAGE NETWORK USING SAS ADDRESSING

TECHNICAL FIELD OF THE INVENTION

This invention relates to data storage systems, and more particularly to fabric-attached data storage systems, which use SAS expanders between the servers and data storage devices.

BACKGROUND OF THE INVENTION

The last 25 years has seen a dramatic shift in computer network configurations. The highly centralized, mainframe-based computing mode has given way to the decentralized client/server design commonly found in today's data centers. More recently, the Storage Area Network (SAN) is essentially a hybrid of the two models.

SANs often consist of several types of servers running different operating systems. This enables users from a wide variety of platforms to access common storage information. But because of inherent bandwidth considerations, not to mention corruption and security concerns, network performance cannot be maximized until resources are allocated.

Zoning is one method of resource allocation. Zoning is a logical separation of traffic between host and resources. By breaking up a network into zones, groups of servers and storages devices may be separated. Thus, isolated, the activities of one group do not affect the activities of the others.

SUMMARY OF THE INVENTION

In accordance with teachings of the present disclosure, a system and method are described for providing zoning to restrict access between specified SAS initiators and targets. Configuration of zones is accomplished using SAS address lists maintained on a per expander basis. Zone management is accomplished using management application functions, such as SMP commands, in conjunction with SAS frame data.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4 illustrates the format of an SAS IDENTIFY address frame.

DETAILED DESCRIPTION OF THE INVENTION

As computer networks expand and their user bases grow, the need for timely access to vast amounts of stored data also grows. Data once accessed through a central file server is now being accessed by multiple servers, which are often running a variety of operating systems and applications.

As indicated in the Background, a SAN (Storage Area Network) comprises a network of shared storage devices. Multiple servers share access to the storage devices. The advantage of a SAN is that a shared storage device can be accessed directly by whichever server needs the data stored in that device, thus reducing system response time, freeing up additional bandwidth, and improving overall network efficiency.

The hardware that connects the servers to the storage devices in a SAN is referred to as a "fabric." The SAN fabric enables any-server-to-any-storage device connectivity through the use of a switching technology.

One conventionally used switching technology is implemented with devices adhering to as standard known as "Fibre Channel". However, as an alternative to Fibre Channel devices, there has been increased interest in using devices configured according to the SAS (Serial Attached SCSI) standard as a storage fabric in small SAN environments, including blade server SANs.

Unlike a Fibre Channel fabric-attached storage configuration, an SAS fabric-attached storage configuration presently lacks a name and management server for implementing port level and address level zoning. This prevents restriction of access to specified SAS initiators and targets, if desired.

Figure 1:
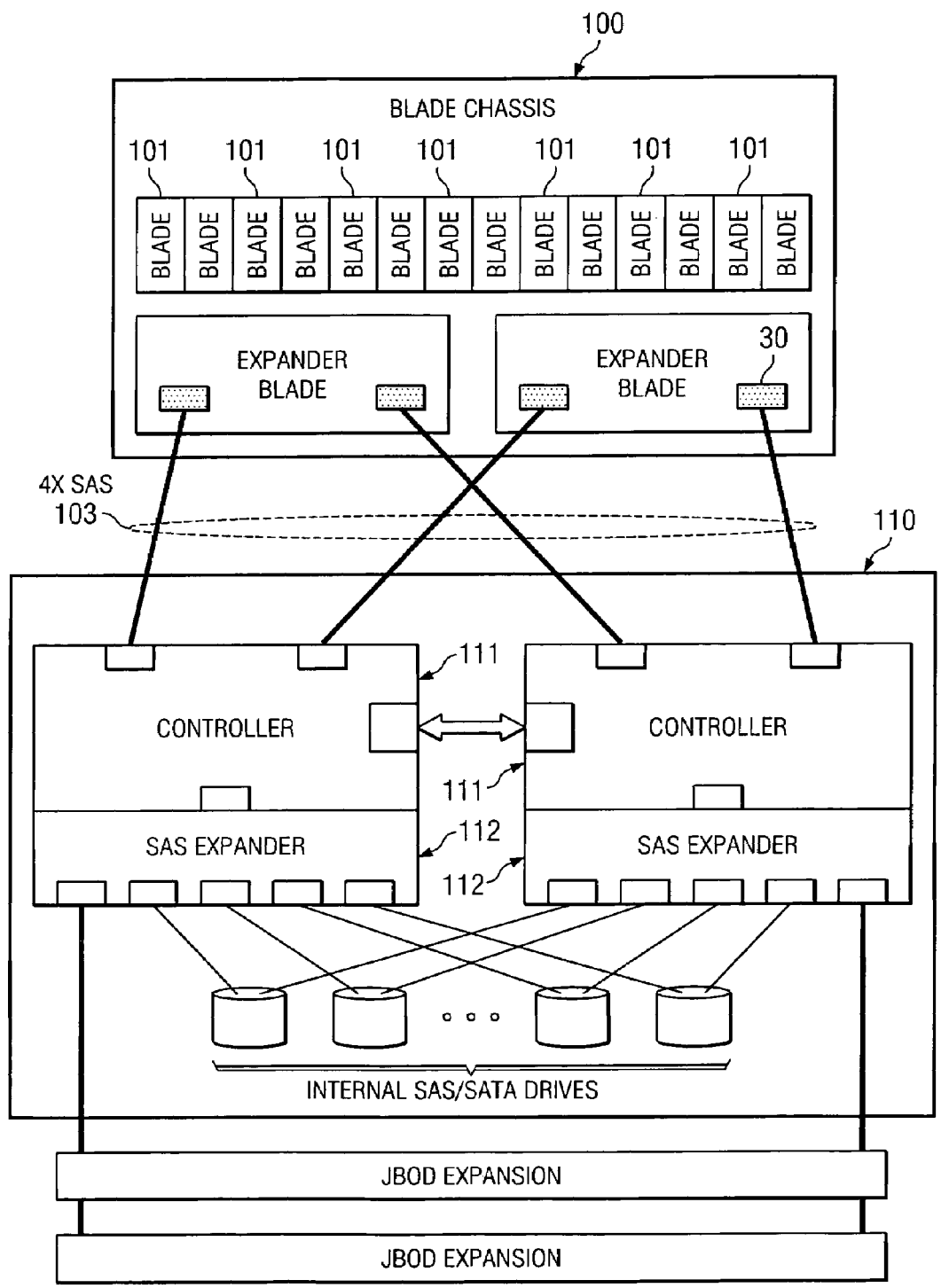
FIG. 1 illustrates a blade server system with an SAS connected RAID storage system.

FIG. 1 illustrates a blade server system 100 connected to an external RBOD (RAID-configured bunch of disks) 110. Each blade server 101 may access storage in the shared RBOD for booting or data storage. In this configuration, SAS expanders 30 are used to connect a large number of server blades to one or more RAID subsystems.

The RBOD controller 111 (shown in FIG. 1 as a redundant pair) is a RAID controller. A RAID (Redundant Array of Inexpensive Disks) consists of two or more disks working in parallel. The disks appear as one drive to the user, and offer enhanced performance or security (or both). The software to perform the RAID-functionality and control the hard disks is located on controller 111.

Controller 111 communicates with system 100 via SAS links 103, which connect the RAID subsystem to a blade chassis SAS expander card. Controller 111 also contains SAS I/O controllers 112, which control input and output to and from the disk drives in accordance with SAS standards.

Figure 2:
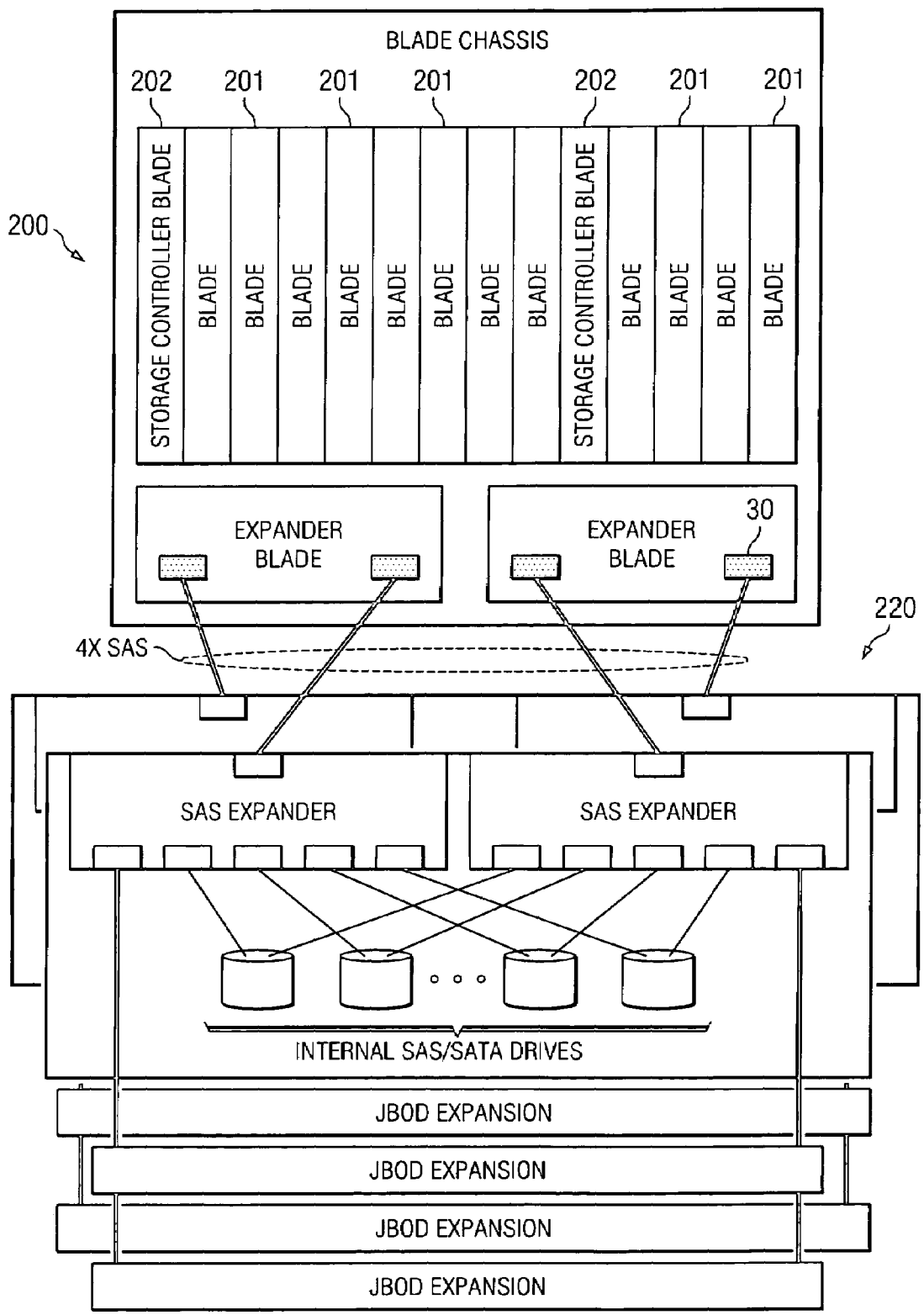
FIG. 2 illustrates a blade server system with an SAS connected storage system than uses one or more server blades as the storage controller(s).

FIG. 2 illustrates a blade server system 200, in which the RAID/virtualization function is contained on two or more blade servers 202 acting as storage controllers for the other server blades 201. Only JBODs 220 (hard disks not configured according to RAID) are attached to the blade system 200. This configuration is sometimes referred to as having "blades as storage controllers", and eliminates the need for separate RAID subsystems. The storage controller blades do the RAID/virtualization function and present the virtual disks to the other blades. As in FIG. 2, SAS expanders 30 are used to connect the server blades to the storage system, in this case, a JBOD storage system.

For purposes of this description, systems 100 and 200 may be any "information handling system" having SAS-configured data storage. An "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In FIGS. 1 and 2, other than the data storage system, only the most basic elements of systems 100 and 200, and those relevant to the invention, are explicitly illustrated. Systems 100 and 200 are assumed to have appropriate processing systems, active memory, and buses for internal and I/O communications. In accordance with SAS terminology, servers 100 and 200 are referred to herein as "initiators", and is typically a data storage server.

Figure 3:
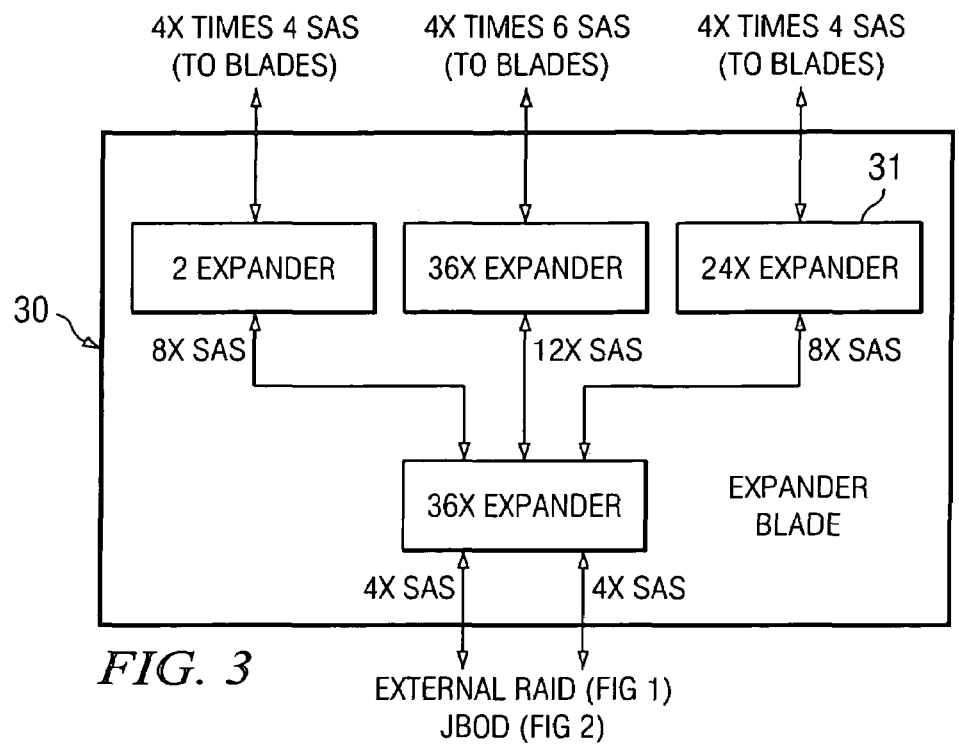
FIG. 3 illustrates an expander blade of FIGS. 1 or 2.

FIG. 3 illustrates an expander blade 30 of FIGS. 1 or 2. In the example of FIG. 3, expander blade 30 has a number of SAS-configured expanders 31. An "expander" is a device that provides an initiator with access to additional targets (and vice versa). Expanders provide functionality similar to that provided by a hub or switch.

Each expander 31 of blade 30 conforms to the SAS standard, which defines how the expander will interface with initiator and target devices. A SAS expander 31 connects initiators to targets, constituting a SAS domain. In the example of FIG. 3, expanders 31 are 24 and 36 port (24*x* and 36*x*) expanders.

A feature of the SAS standard is that large port count expanders, such as the expanders 31 of FIG. 3, may be self configuring. They may automatically detect and program their own route tables of devices that are present. The expanders maintain a direct routing table that identifies all SAS addresses that are directly attached to the expander. As a result, SAS initiators do not need to program routes in the expanders. As explained below, when SAS expanders are present in an SAS domain, route tables are constructed using information received in IDENTIFY address frames.

Systems 100 and 200 use Serial Management Protocol (SMP) commands to configure the expander topology. An SMP Discover command is a command that queries an expander device to determine what is attached to each expander PHY and the associated attached SAS address. Among other things, the Discover command allows the system to determine if Serial ATA tunneled protocol (STP) or serial SCSI protocol (SSP) should be used to communicate with attached devices.

The above-described features of an SAS system can be exploited to "trick" an SAS initiator's view of its domain, that is, which devices reside on its domain. As used herein a "domain" is the set of devices visible through a single initiator port. A single initiator can have as many domains attached as it has ports. A single port is associated with a single "phy", unless the port is a "wide port" that uses more than one phys to establish a wider bandwidth link.

FIG. 4 illustrates the format of the SAS IDENTIFY address frame. An identification sequence is key to all SAS device-to-device communication. During the identification sequence, SAS devices on an operational link exchange IDENTIFY address frames. The IDENTIFY address frame contains information about the connected SAS device, such as its SAS address, whether it supports certain protocols (SMP, STP, SSP), whether it is a target or initiator or both, and the Device Type. A Device Type can be an expander or an end device type.

The information in the IDENTIFY address frame is used by a SAS initiator when it discovers what devices are present in the SAS domain, whether they are target or initiator devices, and the protocols they support.

The information in the IDENTIFY address frame is returned to the SAS initiator, using the SMP Discover command following a SAS discovery algorithm. The Discover command is the SMP command that queries an expander device to determine what is attached to each expander PHY and the associated SAS address. Via SMP commands, initiators are able to find out information about the expander, such as the number of phys in the expander, the type of device connected to a particular expander phys, information about the expander manufacturer, etc.

A "soft zoning" method can be implemented to create zones of accessibility to an expander port. On an expander configured as a wide port, the "port" is a list of phys. Configuration and management of zones may be accomplished using a management application that uses SMP commands in conjunction with SAS frame data.

A SAS initiator may attempt to discover what is attached to an expander port that is not in the same zone, but is in a zone. In that case, when the SMP Discover command is received by the expander's SMP Target port, it will respond with a Device Type of "No Device Attached" or "Phy Vacant". In other words, if a phy requested in an SMP Discover function is not part of the zone, but is part of another zone, the SMP discover function returns with "No End Device Attached" or "Phy Vacant".

Therefore, the SAS initiator has no knowledge that a device exists on the expander port and will not communicate with it. This essentially zones the initiator off from "seeing" that device. If the device is intended to be visible and is in the same zone, then the SMP target port will return the contents received from the IDENTIFY frame in the response to the Discover command.

During an SAS connection setup, a "hard zoning" method may also be performed. SAS uses an OPEN frame to establish a connection between two devices. For "hard zoning", discovery of devices in a zone is based on the source SAS address in the OPEN frame sent to an SMP target port in the expander. Expander 31 routes the OPEN frame to the end device. If the destination SAS device is not present, the expander 31 responds to the OPEN frame. Because the OPEN frame must pass through the expander, which holds the table of allowable SAS addresses for the given destination port, it can return a response to the OPEN frame of OPEN_REJECT (No Destination), indicating that the device does not exist. In other words, zoning is achieved even if the SAS initiator knows the address of a target device from which the initiator is zoned off from.

Figure 5:
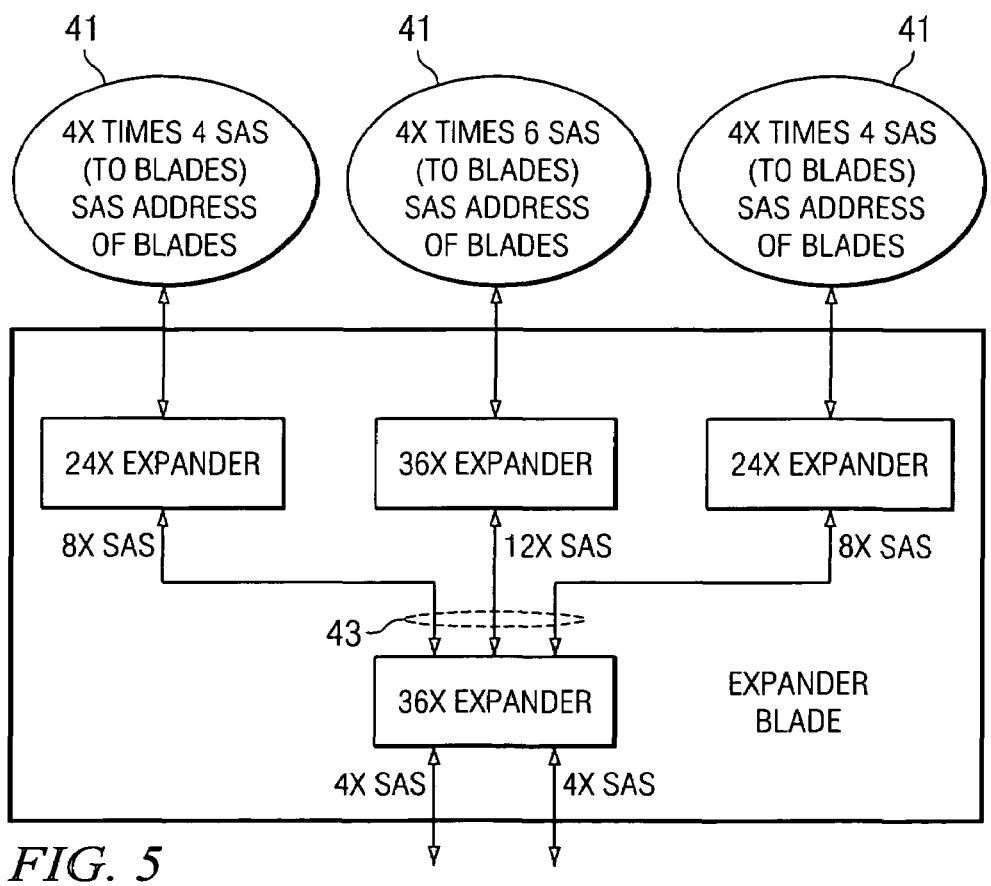
FIG. 5 illustrates a method of implementing zones in accordance with the invention.

FIG. 5 illustrates a method for SAS address-based zoning in accordance with the invention. Three different zones 41 are shown. For each zone, the ports attaching to the RAID controllers are a part of that zone 41.

A zone 41 is implemented using a list of SAS addresses that are permitted to access devices on a list of expander port(s) (phys). From the user's point of view, the list is of SAS initiators that the user wants to allow access to a target connected to a given expander port(s).

Zones are configured on a per expander basis. Because a zone is defined on expander port(s), an SAS initiator may be in multiple zones. In other words, an SAS address may reside in multiple zones. This permits the SAS initiator to access multiple target devices.

In FIG. 5, the links 43 between expanders indicate expander port(s) not contained in any zone, that is, a phy not in any zoning table. These ports would not enforce zoning and may be shared by all devices.

One aspect of SAS to be overcome is its method for a hard reset of a port. During error recovery, an SAS initiator may use this command as a last resort. However, this action disrupts all SAS initiators that are using the link that was reset, and all logical units that are accessible through that port go through a logical unit reset. The SAS command for the hard reset is an SMP Phy Control command. Using this command, a misbehaving SAS initiator or an application client can disable a phy(s) on any expander, causing an SAS target or any other SAS initiator to be removed from the SAS domain.

The hard reset and Phy disablement functions can be controlled by causing the SMP target port that receives the SMP PHY CONTROL command to reject the command. The target port may respond with "Function Not Supported" if the SAS initiator does not have permission to use the hard reset and disablement functions. Control of which SAS initiators have the right to use these functions may be stored in the same tables as the zoning information. Alternatively, this information may be separately stored.

Zones and access controls may be configured using SMP commands. If appropriate, these commands may be vendor specific.

What is claimed is:

1. A method of "soft zoning" a storage device network, in which initiator and target devices are connected via SAS expanders, each expander having a number of expander ports, comprising:
    storing a table of SAS addresses associated with one or more initiator devices that are permitted access to target connected to an expander port;
    wherein the list is accessible by the expander device associated with the expander port;
    using an initiator device to initiate an SMP Discover command;
    receiving the SMP Discover command at an expander port;
    if the initiator is not on the list associated with the expander port, using the expander to respond to the initiator with a message;
    if the initiator is on the list associated with the expander port, using the expander to respond to the initiator with data from an IDENTIFY frame received from the target device.

2. The method of claim 1, wherein the message is a "no device attached message".

3. The method of claim 1, wherein the message is a "phy vacant" message.

4. The method of claim 1, wherein ports with no SAS Addresses on its list may be used by any initiator or target device.

5. The method of claim 1, wherein the initiators comprise server blades and the targets comprise devices connected via a RAID controller.

6. The method of claim 1, wherein the initiators comprise server blades and the targets comprise devices connected via a storage controller blade.

7. The method of claim 1, further comprising configuring zones using SMP commands.

8. A method of "hard zoning" a storage device network, in which initiator and target devices are connected via SAS expanders, each expander having a number of expander ports, comprising:
    storing a table of SAS addresses associated with one or more initiator devices that are permitted access to a target connected to an expander port;
    using an initiator device to initiate a SAS connection;
    receiving an OPEN frame at the expander port;
    if the initiator is not on the list associated with the expander port, using the expander to respond to the OPEN frame with a message;
    if the initiator is on the list associated with the expander port, using the expander to route the Open frame to the target device.

9. The method of claim 8, wherein the message is a "OPEN REJECT (No Destination)" message.

10. The method of claim 8, wherein ports with no SAS Addresses on its list may be used by any initiator or target device.

11. The method of claim 8, wherein the initiators comprise server blades and the targets comprise devices connected via a RAID controller.

12. The method of claim 8, wherein the initiators comprise server blades and the targets comprise devices connected via a storage controller blade.

13. The method of claim 8, further comprising configuring zones using SMP commands.

14. A fabric-attached data storage system, comprising:
    a number of server initiators;
    a network of data storage targets;
    SAS expanders for connecting the server initiators to the data storage targets, each expander having a number of expander ports;
    wherein the expanders use Serial Management Protocol (SMP) commands to communicate with the initiators and the targets;
    wherein each expander has memory for storing tables, each table representing a list of SAS addresses associated with one or more initiator devices that are permitted access to a target connected to an expander port;
    and wherein each expander is programmed to access the tables, such that when an SMP Discover command is received at an expander port, if the initiator is not on the list associated with that expander port, the expander responds to the initiator with a message; and if the initiator is on the list associated with that expander port, the expanders responds to the initiator with data from an IDENTIFY frame received from the target device.

15. The system of claim 14, wherein the message is a "no device attached message".

16. The system of claim 14, wherein the message is a "phy vacant" message.

17. The system of claim 14, wherein the initiators comprise server blades and the targets comprise devices connected via a RAID controller.

18. The system of claim 14, wherein the initiators comprise server blades and the targets comprise devices connected via a storage controller blade.

19. A fabric-attached data storage system, comprising:
    a number of server initiators;
    a network of data storage targets;
    SAS expanders for connecting the server initiators to the data storage targets, each expander having a number of expander ports;
    wherein the expanders use Serial Management Protocol (SMP) commands to communicate with the initiators and the targets;
    wherein each expander has memory for storing tables, each table representing a list of SAS addresses associated with one or more initiator devices that are permitted access to a target connected to an expander port;
    and wherein each expander is programmed to access the tables, such that an initiator device initiates a SAS connection and an OPEN frame is received at an expander port; if the initiator is not on the list associated with the expander port, using the expander to respond to the OPEN frame with a message; and if the initiator is on the list associated with the expander port, using the expander to route the Open frame to the target device.

20. The system of claim 19, wherein the message is a "OPEN REJECT (No Destination)" message.

21. The system of claim 19, wherein the initiators comprise server blades and the targets comprise devices connected via a RAID controller.

22. The system of claim 19, wherein the initiators comprise server blades and the targets comprise devices connected via a storage controller blade.

* * * * *